(12) United States Patent
Borkar et al.

(10) Patent No.: US 11,208,157 B2
(45) Date of Patent: Dec. 28, 2021

(54) TAILGATE ASSEMBLY WITH CARGO BED ACCESS OPENING AND METHOD OF PROVIDING ACCESS TO A CARGO BED OF A VEHICLE

(71) Applicant: Ford Global Technologies, LLC, Dearborn, MI (US)

(72) Inventors: Amol Borkar, Nagpur (IN); Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 16/700,365

(22) Filed: Dec. 2, 2019

(65) Prior Publication Data

US 2021/0163082 A1 Jun. 3, 2021

(51) Int. Cl.
*B62D 33/037* (2006.01)
*B60R 3/02* (2006.01)

(52) U.S. Cl.
CPC .............. *B62D 33/037* (2013.01); *B60R 3/02* (2013.01)

(58) Field of Classification Search
CPC ................................ B62D 33/037; B60R 3/02
See application file for complete search history.

(56) References Cited

U.S. PATENT DOCUMENTS

| | | |
|---|---|---|
| 6,886,877 B1 * | 5/2005 | Plavetich ........... B62D 33/0273 296/186.3 |
| 6,991,277 B1 | 1/2006 | Esler |
| 6,994,363 B2 | 2/2006 | Seksaria et al. |
| 7,165,800 B2 | 1/2007 | Thiele et al. |
| 7,232,173 B2 | 6/2007 | Katterloher et al. |
| 7,712,811 B2 | 5/2010 | Heaman et al. |
| 8,348,325 B2 | 1/2013 | Hausler et al. |
| 8,740,279 B1 | 6/2014 | McGoff et al. |
| 8,919,853 B2 | 12/2014 | Krishnan et al. |
| 9,988,103 B1 | 6/2018 | Mouch et al. |
| 10,081,303 B1 | 9/2018 | Ngo et al. |
| 2021/0221448 A1 * | 7/2021 | Hung ................. B62D 33/0273 |

* cited by examiner

*Primary Examiner* — D Glenn Dayoan
*Assistant Examiner* — Melissa Ann Bonifazi
(74) *Attorney, Agent, or Firm* — David Coppiellie, Esq.; Carlson, Gaskey & Olds, P.C.

(57) ABSTRACT

A tailgate assembly according to an exemplary aspect of the present disclosure includes, among other things, a primary tailgate having a cargo bed access opening. The primary tailgate moveable between a closed position and a fully open position relative to a cargo bed of a vehicle. The tailgate assembly further including a secondary tailgate that can move between a blocking position where the secondary tailgate extends into the cargo bed access opening and an accessing position where the secondary tailgate is retracted away from the cargo bed access opening. The secondary tailgate in the accessing position at least partially retracted into a portion of the primary tailgate that is vertically beneath the cargo bed access opening when the primary tailgate is in the closed position.

17 Claims, 8 Drawing Sheets

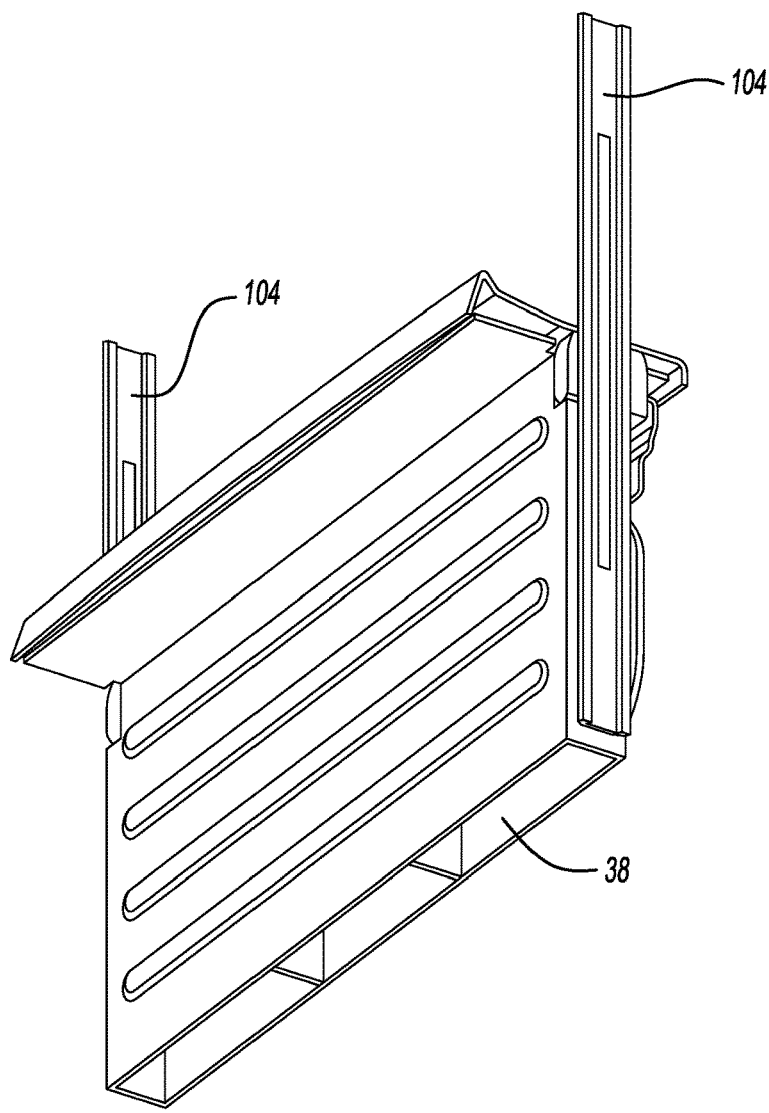
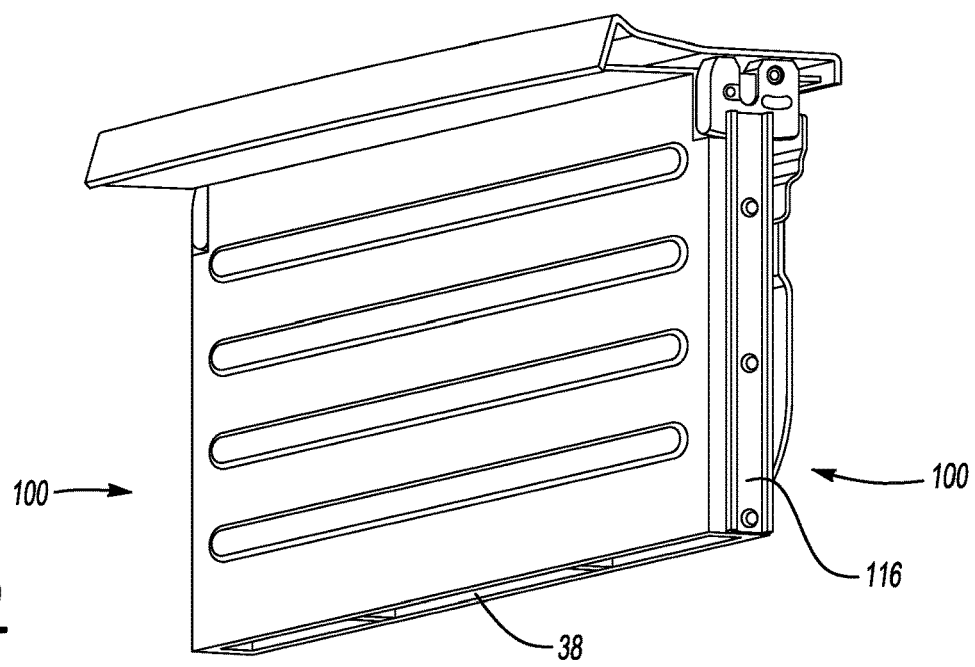

TAILGATE ASSEMBLY WITH CARGO BED ACCESS OPENING AND METHOD OF PROVIDING ACCESS TO A CARGO BED OF A VEHICLE

TECHNICAL FIELD

This disclosure relates generally to a tailgate assembly for a vehicle and, more particularly, to a tailgate assembly that can selectively provide a cargo bed access opening with a primary tailgate of the tailgate assembly.

BACKGROUND

Vehicles, such as pickup trucks, include a cargo bed. A tailgate assembly can enclose one end of the cargo bed when the tailgate assembly is in a closed position. The tailgate assembly can pivot to an open position where the tailgate assembly is substantially horizontal and aligned with a floor of the cargo bed.

SUMMARY

A tailgate assembly according to an exemplary aspect of the present disclosure includes, among other things, a primary tailgate having a cargo bed access opening. The primary tailgate is moveable between a closed position and a fully open position relative to a cargo bed of a vehicle. The tailgate assembly further including a secondary tailgate that can move between a blocking position where the secondary tailgate extends into the cargo bed access opening and an accessing position where the secondary tailgate is retracted away from the cargo bed access opening. The secondary tailgate in the accessing position is at least partially retracted into a portion of the primary tailgate that is vertically beneath the cargo bed access opening when the primary tailgate is in the closed position In another example of the foregoing tailgate assembly, the secondary tailgate is slidably coupled to the primary tailgate. Relative to the primary tailgate, the secondary tailgate is slidable back and forth between the blocking position and the accessing position.

In another example of any of the foregoing tailgate assemblies, the primary tailgate is configured to be pivotably coupled to a cargo bed of a vehicle such that the primary tailgate can pivot relative to the cargo bed back and forth between the closed position and the fully open position. The primary tailgate is substantially vertical when in the closed position. The primary tailgate is substantially horizontal when in the fully open position. When the primary tailgate is in the fully open position, a user can move into the cargo bed access opening to be horizontally closer to the cargo bed of the vehicle when the secondary tailgate is in the accessing position.

In another example of any of the foregoing tailgate assemblies, the secondary tailgate is at least partially retracted into an interior of the primary tailgate when in the accessing position.

Another example of any of the foregoing tailgate assemblies includes an inner panel of the primary tailgate and an outer panel of the primary tailgate. The interior of the primary tailgate is provided between the inner panel and the outer panel.

Another example of any of the foregoing tailgate assemblies includes a driver side latch and a passenger side latch. The driver side latch is disposed between a portion of the primary tailgate and a driver side of the secondary tailgate. The passenger side latch is disposed between another portion of the primary tailgate and a passenger side of the secondary tailgate. The driver side latch and the passenger side latch are transitionable between respective unlatched and latched positions. The driver side latch and the passenger side latch are configured to hold the primary tailgate in the blocking position when the driver side latch and the passenger side latch are in latched positions.

In another example of any of the foregoing tailgate assemblies, the driver side latch and the passenger side latch are each electronic latches.

Another example of any of the foregoing tailgate assemblies includes at least one fixed rail member secured to the primary tailgate and at least one sliding rail member secured to the secondary tailgate. The at least one fixed rail member and the at least one sliding rail member slidably couple together the primary tailgate and the secondary tailgate. The at least one fixed rail member and the at least one sliding rail member are slidable relative to each other to permit sliding movement of the secondary tailgate between the retracted position and the blocking position.

In another example of any of the foregoing tailgate assemblies, the at least one fixed rail member is bowed relative to a longitudinal axis of the at least one fixed rail member such that, as the secondary tailgate slides from the retracted position to the blocking position, the secondary tailgate is moved outwardly toward an outer surface of the primary tailgate or inwardly toward an inner surface of the primary tailgate.

In another example of any of the foregoing tailgate assemblies, the primary tailgate is configured to be pivotably coupled to a cargo bed of a vehicle such that the primary tailgate can pivot relative to the cargo bed back and forth between the closed position and the fully open position. The primary tailgate is substantially vertical when in the closed position. The primary tailgate is substantially horizontal when in the fully open position.

In another example of any of the foregoing tailgate assemblies, the primary tailgate includes a driver side portion, a passenger side portion, and an intermediate portion disposed between the driver side portion and the passenger side portion. When the primary tailgate is in the closed position, a vertical height of the intermediate portion is less than a vertical height of both the driver side portion and the passenger side portion. The secondary tailgate at least partially retracted into the intermediate portion of the primary tailgate when the secondary tailgate is in the accessing position In another example of any of the foregoing tailgate assemblies, the primary tailgate includes a driver side portion, a passenger side portion, and an intermediate portion disposed between the driver side portion and the passenger side portion. When the primary tailgate is in the closed position, the cargo access opening is vertically above the intermediate portion and horizontally between the driver side portion and the passenger side portion.

In another example of any of the foregoing tailgate assemblies, the secondary tailgate can further move to an extended position where the secondary tailgate is extended away, and spaced a distance from, the primary tailgate.

In another example of any of the foregoing tailgate assemblies, the primary tailgate is configured to be pivotably coupled to a cargo bed of a vehicle such that the primary tailgate can pivot relative to the cargo bed back and forth between the closed position and the fully open position. The primary tailgate is substantially vertical when in the closed position. The primary tailgate is substantially horizontal when in the fully open position. When the primary tailgate is in the fully open position and the secondary tailgate is in the extended position, the secondary tailgate is substantially horizontal and is vertically beneath the primary tailgate such that the secondary tailgate provides a step.

In another example of any of the foregoing tailgate assemblies, when the primary tailgate is in the closed position and the secondary tailgate is in the extended position, the secondary tailgate is substantially vertical and is horizontally aft the primary tailgate relative to an orientation of the vehicle.

Another example of any of the foregoing tailgate assemblies includes a bar linkage mechanism that couples the secondary tailgate to the primary tailgate. The secondary tailgate is moveable back and forth between the extended position and the closed position via the bar linkage mechanism.

Another example of any of the foregoing tailgate assemblies includes at least one fixed rail member secured to the primary tailgate and at least one sliding rail member secured to the secondary tailgate. The at least one fixed rail member and the at least one sliding rail member slidably couple together the primary tailgate and the secondary tailgate. The at least one fixed rail member and the at least one sliding rail member are slidable relative to each other to permit sliding movement of the secondary tailgate between the retracted position and the blocking position.

A method of providing access to a cargo bed of a vehicle according to another exemplary aspect of the present disclosure includes, among other things, retracting a secondary tailgate within a primary tailgate to move the secondary tailgate from a blocking position where the secondary tailgate extends into a cargo bed access opening to an accessing position where the secondary tailgate is retracted away from the cargo bed access opening. The secondary tailgate retracted into a portion of the primary tailgate that is vertically beneath the cargo bed access opening when the primary tailgate is in a closed position.

Another example of the foregoing method includes moving the secondary tailgate from the blocking position to an extended position where the secondary tailgate is extended away, and spaced a distance from, the primary tailgate, providing a step to a cargo bed of the vehicle using the secondary tailgate in the extended position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 9 illustrates a perspective view of the secondary tailgate from the tailgate assembly of FIG. 1 along with slidable rails of a rail assembly.

FIG. 10 illustrates another perspective view of the secondary tailgate from the tailgate assembly of FIG. 1 along with stationary rails of the rail assembly.

DETAILED DESCRIPTION

This disclosure details exemplary assemblies and methods of providing a tailgate assembly having a selectively provided cargo bed access opening. A user can utilize the cargo bed access opening to, among other things, help the user access to a cargo bed of a vehicle.

Figure 1:
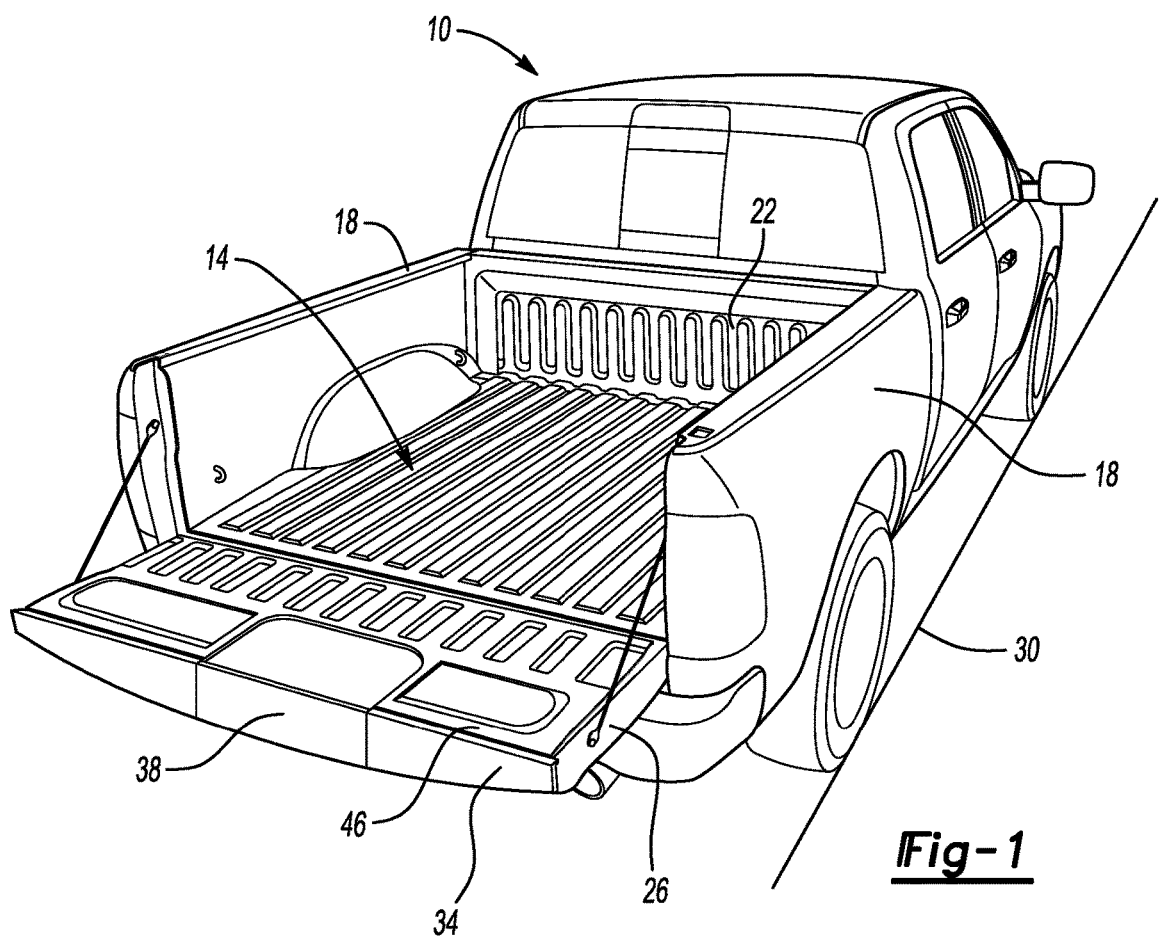
FIG. 1 illustrates a rear perspective view of a pickup truck having a cargo bed and a tailgate assembly with a primary tailgate of the tailgate assembly in a fully open position and a secondary tailgate of the tailgate assembly in a blocking position according to an exemplary embodiment of the present disclosure.

FIG. 1 illustrates a vehicle 10, here a pickup truck, having a cargo bed area 14 that is defined by a pair of sidewalls 18, a front wall 22, and a tailgate assembly 26 according to an exemplary aspect of the present disclosure. The tailgate assembly 26 includes, among other things, a primary tailgate 34 and a secondary tailgate 38. The primary tailgate 24 can move back and forth between a closed position and a fully open position.

Figure 2:
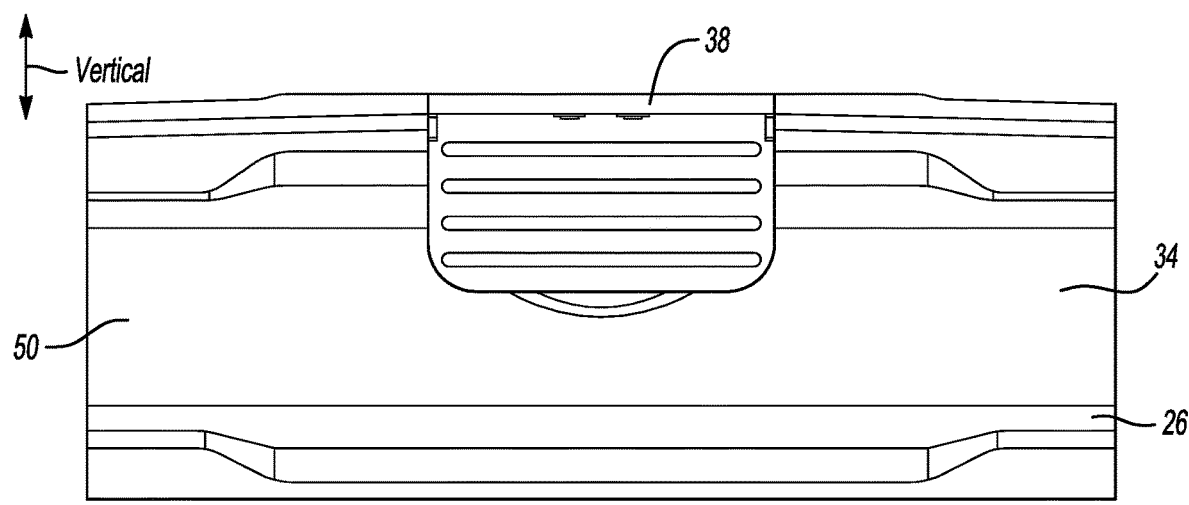
FIG. 2 illustrates a rear view of the tailgate assembly of FIG. 1 with the primary tailgate of the tailgate assembly in a closed position and the secondary tailgate of the tailgate assembly in the blocking position.

In FIG. 1, the primary tailgate 34 is shown in a fully open position where the tailgate assembly 26 is substantially horizontally aligned. FIG. 2 illustrates the primary tailgate 34 after pivoting from the fully open position to a closed position.

In the closed position, the primary tailgate 34 encloses an aft end of the cargo bed area 14 to, among other things, prevent cargo from sliding out of the cargo bed area 14. In the closed position, the primary tailgate 34 is vertically aligned. Horizontal and vertical, for purposes of this disclosure, are with reference to the general orientation of the vehicle 10 during operation and ground 30. The secondary tailgate 38 pivots with the primary tailgate 34 when the primary tailgate 34 is moved back and forth between the fully open position and the closed position.

Figure 3:
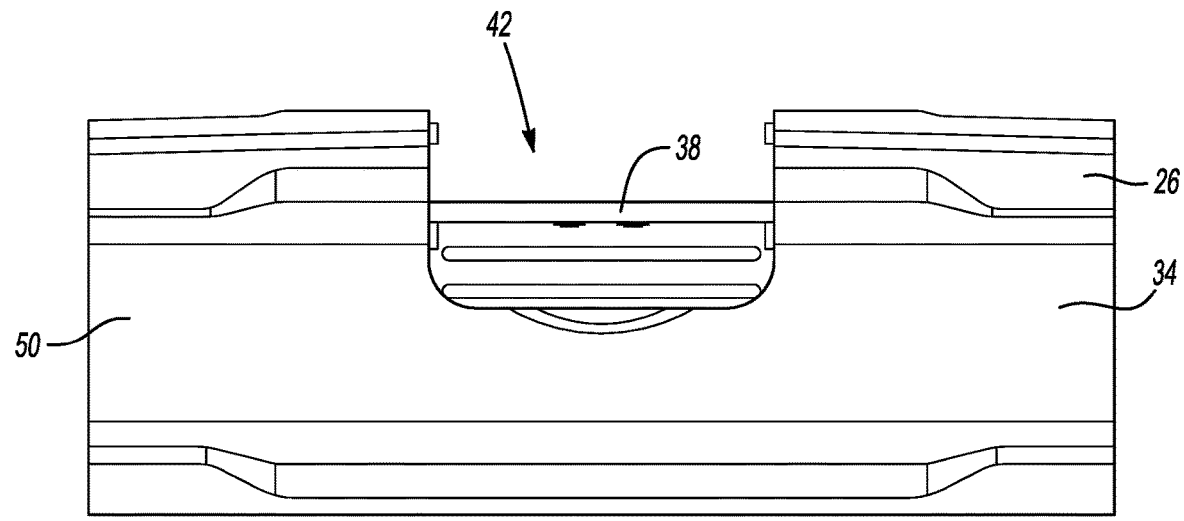
FIG. 3 illustrates the rear view of FIG. 2 with the secondary tailgate in an exemplary accessing position where a portion of the secondary tailgate is retracted away from a cargo bed access opening of the primary tailgate.
Figure 4:
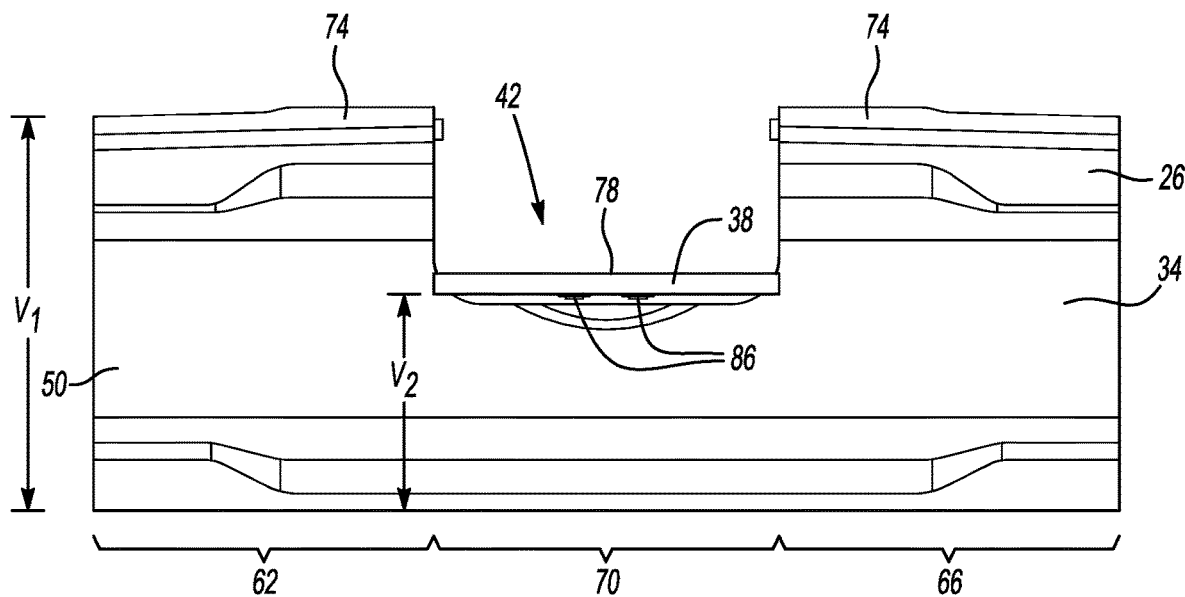
FIG. 4 illustrates the rear view of FIG. 2 with the secondary tailgate in an exemplary accessing position where a portion of the secondary tailgate is retracted within the primary tailgate further than in FIG. 3 to increase an amount of the cargo bed access opening that is not blocked by the secondary tailgate.

With reference now to FIGS. 3 and 4 and continuing reference to FIG. 2, the primary tailgate 34 includes a cargo bed access opening 42. In FIG. 2, the secondary tailgate 38 is shown slid into a blocking position where the secondary tailgate 38 is fully extended into the cargo bed access opening 42. The secondary tailgate 38 is slidably coupled to the primary tailgate 34 in the exemplary embodiment.

The secondary tailgate 38 can slide relative to the primary tailgate 34 back and forth from the blocking position of FIG. 2 to an accessing position where the secondary tailgate 38 is partially retracted into the secondary tailgate 38, and to the accessing position of FIG. 4 where the secondary tailgate 38 is more fully retracted into the secondary tailgate 38.

When in the accessing positions, the secondary tailgate 38 is retracted away from at least a portion of the cargo bed access opening 42 provided by the primary tailgate 34. The secondary tailgate 38 in the accessing positions is at least partially retracted into a portion of the primary tailgate 34. When the primary tailgate 34 is in the closed position of FIG. 4, the portion of the primary tailgate 34 that receives the secondary tailgate 38 is vertically beneath the cargo bed access opening 42.

The primary tailgate 34 includes, among other things, an inner panel 46 and an outer panel 50. When the primary tailgate 34 is in the fully open position, the inner panel 46 provides a flat surface that is substantially even with a floor of the cargo bed area 14. An interior of the primary tailgate 34 is provided between the inner panel 46 and the outer panel 50. In the exemplary embodiment, in the accessing positions, the secondary tailgate 38 is at least partially retracted into the interior of the primary tailgate 34 when moving from the blocking position to an accessing position.

When the secondary tailgate 38 is in an accessing position and the tailgate assembly 26 is in the closed position of FIG. 4, a user can, for example, reach horizontally through the cargo bed access opening 42 to access cargo within the cargo bed area 14. Further, cargo can extend through the cargo bed access opening 42 if the cargo cannot be contained entirely within the cargo bed area 14. For example, a user could place cargo, such as lumber, partially within the cargo bed area 14. A portion of the lumber can then extend longitudinally through the cargo bed access opening 42 for transport by the vehicle 10.

Figure 5:
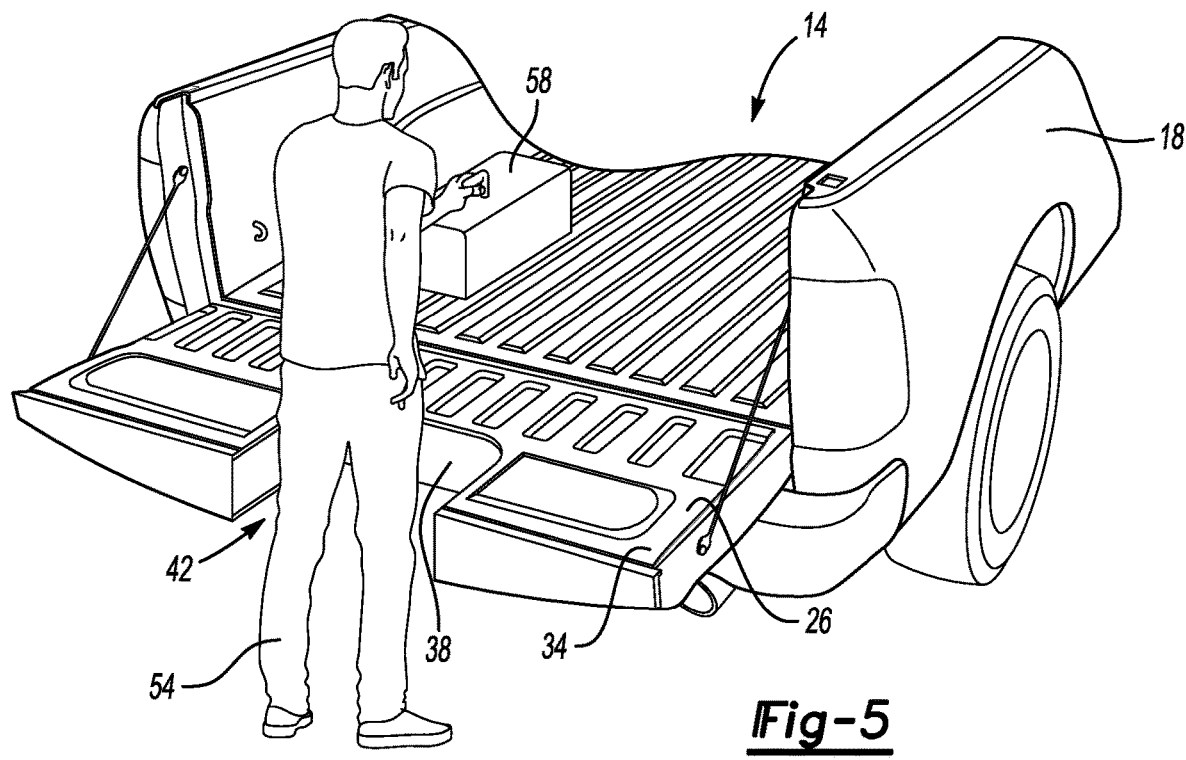
FIG. 5 illustrates a rear perspective view of the pickup truck of FIG. 1 with the primary tailgate of the tailgate assembly in the fully open position and the secondary tailgate of the tailgate assembly in the accessing position of FIG. 4 where the secondary tailgate is retracted away from the cargo bed access opening of the primary tailgate.

The secondary tailgate 38 retracted into the accessing position can also facilitate access to the cargo bed area 14 when the primary tailgate 34 is in the fully open position as shown in FIG. 5. A user 54 can move horizontally into the cargo bed access opening 42, to place cargo 58 in the cargo bed area 14, or to remove cargo 58 from the cargo bed area 14. The cargo bed access opening 42 enables the user 54 to move into the cargo bed access opening 42 such that the user 54 is horizontally closer to the cargo bed area 14 of the vehicle 10.

If the cargo bed access opening 42 is not needed, the secondary tailgate 38 can be extended into the blocking position of FIGS. 1 and 2 where the secondary tailgate 38 extends into the cargo bed access opening 42 and substantially closes the cargo bed access opening 42.

With reference again to FIG. 4, the primary tailgate 34 includes a driver side portion 62, a passenger side portion 66, and an intermediate portion 70. The intermediate portion 70 is disposed horizontally between the driver side portion 62 and the passenger side portion 66. When the primary tailgate 34 is in the closed position, as shown, the driver side portion 62 and the passenger side portion 66 have a vertical height $V_1$ that is greater than a vertical height $V_2$ of the intermediate portion 70. The primary tailgate 34 thus has a substantially U-shaped configuration when viewed from the rear. Other configurations could be used in other examples.

Trim pieces 74 are disposed atop the driver side portion 62 and the passenger side portion 66 to conceal the interior of the primary tailgate 34, provide protection, hide the mechanisms, etc. Another trim piece 78 can be disposed at an end of the secondary tailgate 38 and moved with the secondary tailgate 38 between the blocking position and the accessing position. In the exemplary embodiment, the trim piece 78 of the secondary tailgate 38 remains exposed when the secondary tailgate 38 is in the blocking position and the accessing position. The trim piece 78 can thus help prevent cargo that extends through the cargo bed access opening 42 from damaging the intermediate portion 70 of the primary tailgate 34. The trim piece 78 can, in some examples, provide a handle for a user to grasp when moving the secondary tailgate 38 back and forth between the closed position and the accessing position.

When the primary tailgate 34 is in the closed position of FIG. 4, the secondary tailgate 38 is moved vertically downward when moving from the blocking position to an accessing position, and is moved vertically upward when moving from an accessing position to the blocking position. When the primary tailgate 34 is in the closed position, gravity can be used to assist movement of the secondary tailgate 38 vertically downward from the blocking position to an accessing position. Dampers, lift-assists, or both, could be incorporated to slow movement of the secondary tailgate 38 to the accessing position and to assist in movement of the secondary tailgate 38 to the blocking position. In some examples, a powered actuator could be used to drive movement of the secondary tailgate 38 between the blocking position and the accessing position.

Figure 6:
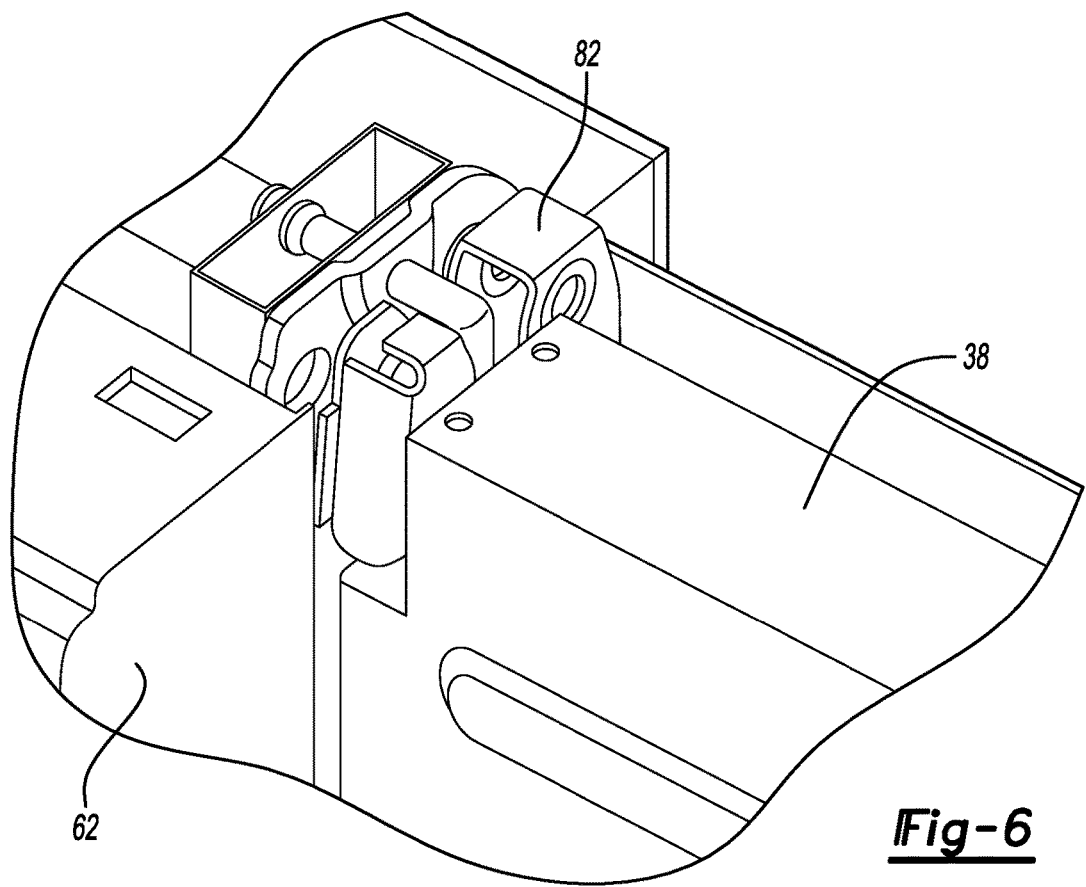
FIG. 6 illustrates a close-up perspective view of a portion of the tailgate assembly of FIG. 1 with a selected trim pieces removed to reveal a driver side latch.
Figure 7:
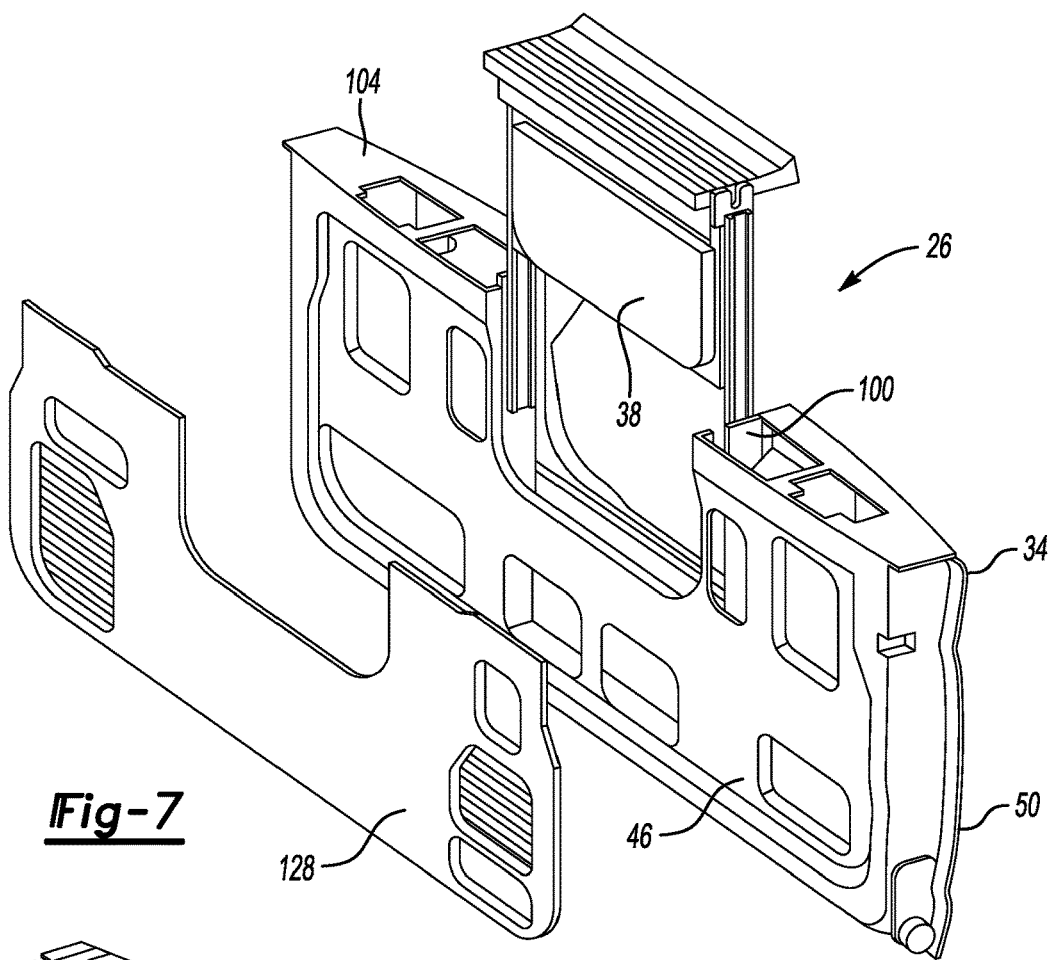
FIG. 7 illustrates a perspective and expanded view of the tailgate assembly of FIG. 1.
Figure 8:
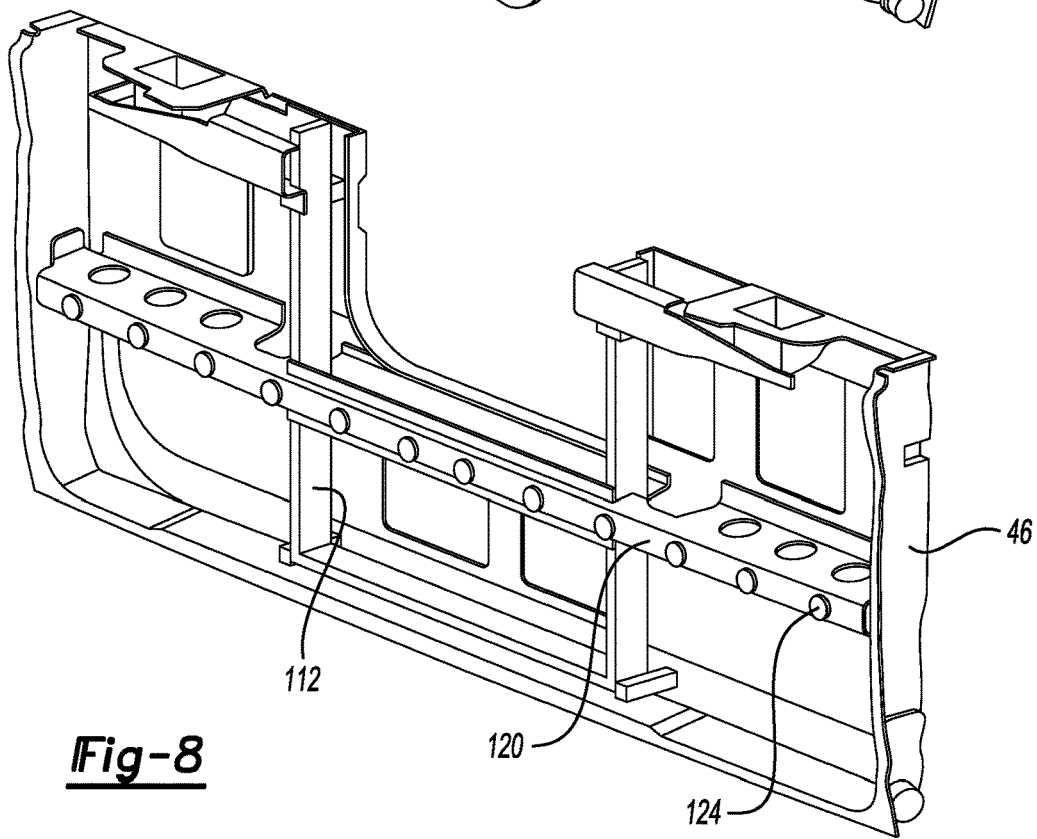
FIG. 8 illustrates a perspective view of the primary tailgate of FIG. 7 with an outer panel removed to reveal an interior of the primary tailgate.

FIG. 6 illustrates a close-up view of an area of the driver side portion 62 and the secondary tailgate 38 with the trim piece 74 removed from the driver side portion 62 and the trim piece 78 removed from the secondary tailgate 38. As shown, a driver side latch 82 is disposed in this area between the driver side portion 62 of the primary tailgate 34 and the secondary tailgate 38. Another latch (not shown) can be disposed between the passenger side portion 66 of the primary tailgate 34 and the secondary tailgate 38.

The driver side latch 82 and the passenger side latch are transitionable between unlatched and latched positions. In the latched position, the driver side latch 82 and the passenger side latch can hold the secondary tailgate 38 in the blocking position. In an exemplary embodiment, the driver side latch 82 and the passenger side latch are electronic latches that transition electronically back and forth between the latched and unlatched positions. In an example, when the primary tailgate 34 is in the closed position and the secondary tailgate 38 is in the blocking position, the driver side latch 82 and the passenger side latch could be unlatched permitting the secondary tailgate 38 to drop vertically from the blocking position to an accessing position. The dropping could be damped or otherwise controlled.

One or more switches 86 can be utilized to trigger the release or engagement of the driver side latch 82 and the passenger side latch. The switches 86, in the exemplary embodiment, are disposed on the secondary tailgate 38 beneath a lip of the trim panel 78, as shown in FIG. 4.

With reference now to FIGS. 7-10, a pair of rail assemblies 100 slidably couple the secondary tailgate 38 to the primary tailgate 34 to permit the sliding movement of the secondary tailgate 38 back and forth between the blocking position and the retracted position.

The rail assemblies 100 includes a pair of fixed rail members 104 and a pair of slidable rail members 108. The fixed rail members 104 are secured to a U-shaped structural member 112 that is disposed within the interior of the primary tailgate 34. The fixed rail members 104 can be directly secured to the U-shaped structural member 112 on either side of the cargo bed access opening 42. The U-shaped structural member 112 can be secured to the inner panel 46 and the outer panel 50 using mechanical fasteners, such as bolts.

Attached to the opposite sides of the secondary tailgate 38 are corresponding slidable rail members 116 of the rail assemblies 100. The slidable rail members 116 can slide within grooves of the fixed rail members 104 as the secondary tailgate 38 is retracted and extended back and forth between the blocking position and the accessing positions.

The rail assemblies 100 can be configured similar to industrial drawers and the sliding mechanisms associated therewith. In the exemplary embodiment, the rail assemblies 100 slide along substantially linear paths.

Figure 11:
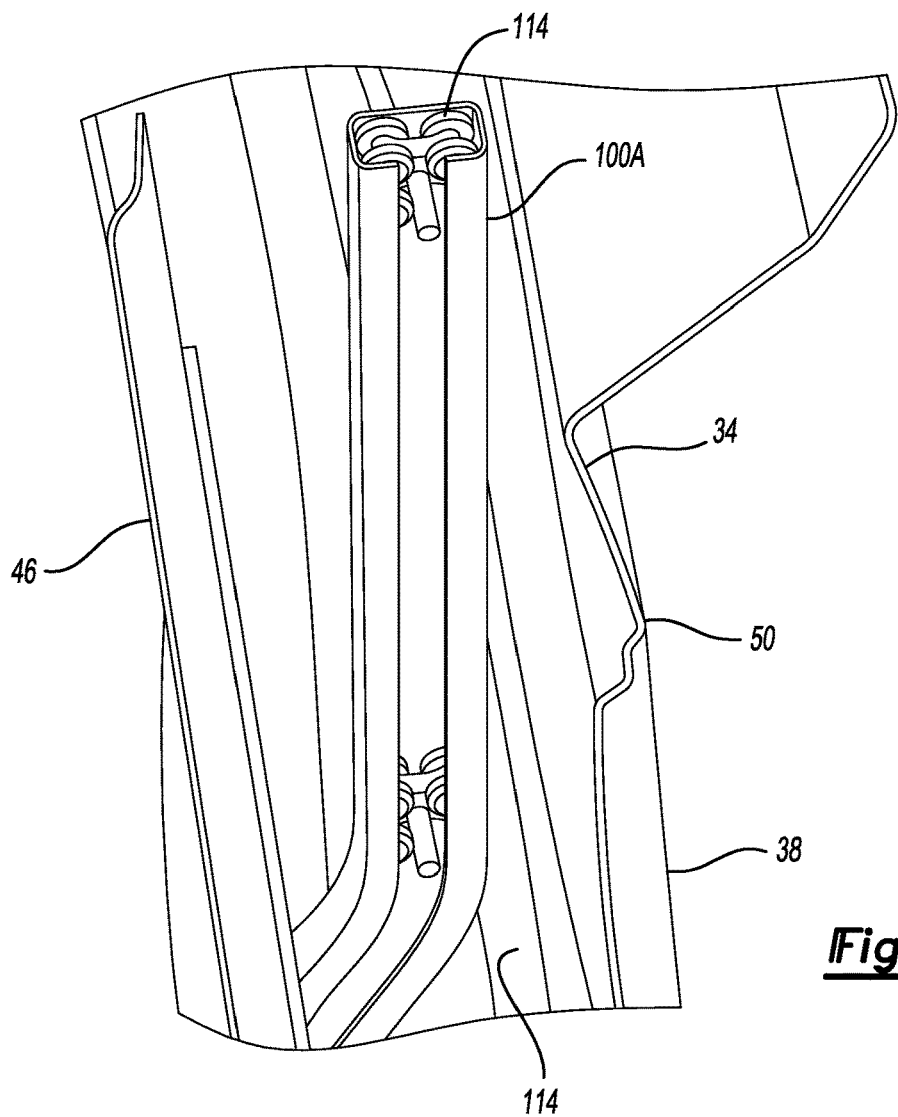
FIG. 11 illustrates a closeup view of a rail assembly according to another exemplary aspect of the present disclosure.
Figure 12:
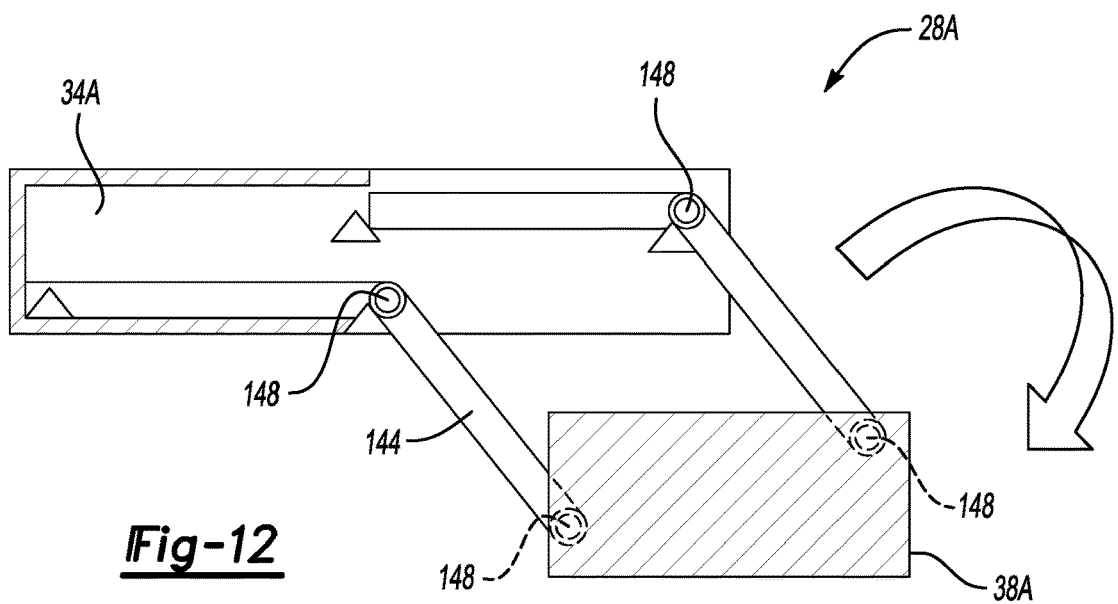
FIG. 12 illustrates a section view of a tailgate assembly according to another exemplary embodiment of the present disclosure where a secondary tailgate of the tailgate assembly is moved to an extended position relative to a primary tailgate.

With reference to FIG. 11, in another exemplary embodiment, rail assemblies 100A include fixed rail members 104A and rollers 114. The rollers 114 are attached directly to the secondary tailgate and can be used in place of the slidable rail members 116 shown in FIG. 10.

Notably, the fixed rail members 104A are bowed relative to a longitudinal axis of the fixed rail members 104A. The rollers 114, when moved along the fixed rail members 104A, cause the secondary tailgate deviate from a linear path of travel when extending and retracting between the blocking position and the accessing position.

The bow of the fixed rail members 104A in the exemplary embodiment causes the secondary tailgate to move outward toward the outer panel 50 of the primary tailgate 34 when the secondary tailgate slides from the accessing position to the blocking position. Moving the secondary tailgate along the bowed path provided by the fixed rail members 104A can result in an outwardly facing surface of the secondary tailgate being substantially aligned with the outer panel 50 of the primary tailgate 34 when the secondary tailgate is in the blocking position. That is, due to the bowed path, the class-A surfaces of the secondary tailgate and the primary tailgate 34 are flush when the secondary tailgate 38 is in the blocking position.

As can be appreciated, the rail assemblies 100A could be bowed differently such that the secondary tailgate moves inward toward the inner panel 46 of the primary tailgate 34 when the secondary tailgate slides to the blocking position. In such an example, the inwardly facing surface of the secondary tailgate can be aligned substantially planar with the inner panel 46 of primary tailgate 34 when the secondary tailgate is in the blocking position.

Referring again to FIG. 8, the U-shaped structural member 112 extends through openings in a cross-member 120 of the primary tailgate 34. Daubs of mastic 124 can be utilized to help secure the cross-member 120 to the inner panel 46 of the primary tailgate 34. This can facilitate improved structural integrity of the tailgate assembly 26.

A trim panel 128 can be placed over the inner panel 46 of the primary tailgate 34 to conceal mechanisms and provide a suitable surface for loading and unloading goods from the cargo bed area 14 of the vehicle 10. The trim panel 128 can provide part of a flat surface of the tailgate assembly 26 that is aligned with the floor of the cargo bed area 14 when the tailgate assembly 26 is fully open.

In this example, the primary tailgate 34 is a metal or metal alloy, such as aluminum. The secondary tailgate 38 can also be a metal or metal alloy. In some examples, the secondary tailgate 38 is a polymer based material.

The secondary tailgate 38 in the embodiment of FIGS. 1-10 is moveable back and forth between the blocking position and the accessing position. In another exemplary embodiment, shown in FIGS. 12-16, a secondary tailgate 38A of a tailgate assembly 26A can additionally move to an extended position where the secondary tailgate 38A is extended away and spaced a distance from a primary tailgate 34.

In the exemplary embodiment, outer step portions 40S move with the secondary tailgate 38A from a blocking position to the extended position of FIGS. 12-15. However, the outer step portions 40S, in the exemplary embodiment, do not transition with the secondary tailgate 38A from the blocking position to the accessing position of FIG. 15. The secondary tailgate 38A is slidably coupled to the primary tailgate 34A to permit the sliding movement of the secondary tailgate 38A back and forth between the blocking position and the accessing position. Rail assemblies can be used to permit the sliding movement of the secondary tailgate 38A relative to the outer step portions 40S and the primary tailgate 34A. Portions of the rail assemblies can be secured to the outer step portions 40S and the secondary tailgate 38A.

The secondary tailgate 38A is additionally, along with the outer step portions 40S, coupled to the primary tailgate 34A through a bar linkage mechanism 144. The bar linkage mechanism 144 can connect to the outer step portions 40S and the primary tailgate 34A at via a plurality of pivots 148. The secondary tailgate 38A and outer step portions 40S are movable back and forth from the blocking position to the extended position via the bar linkage mechanism 144.

Figure 13:
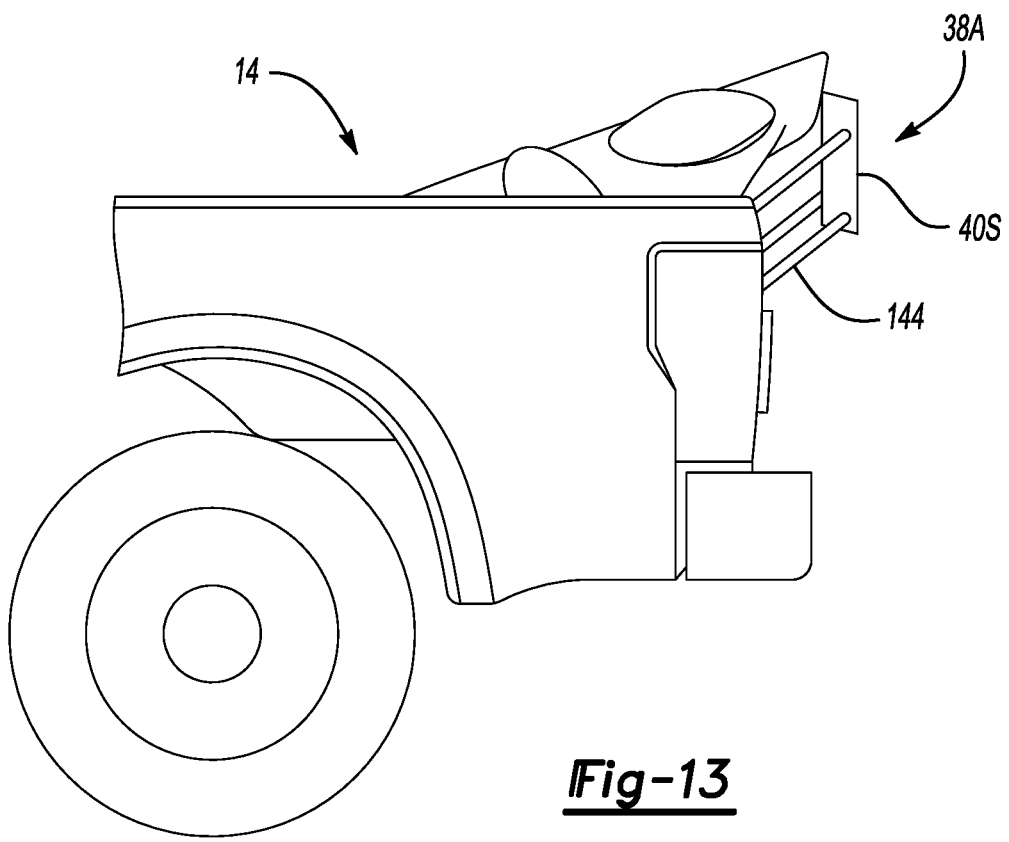
FIG. 13 illustrates a side view of the secondary tailgate in the extended position of FIG. 12 when the primary tailgate is in a closed position.

When the primary tailgate 34A is in the closed position and the secondary tailgate 38A is in the extended position as shown in FIG. 13, the secondary tailgate 38A is substantially vertical, and is horizontally aft and spaced from, the primary tailgate 34A relative to a general orientation of the vehicle 10.

Figure 14:
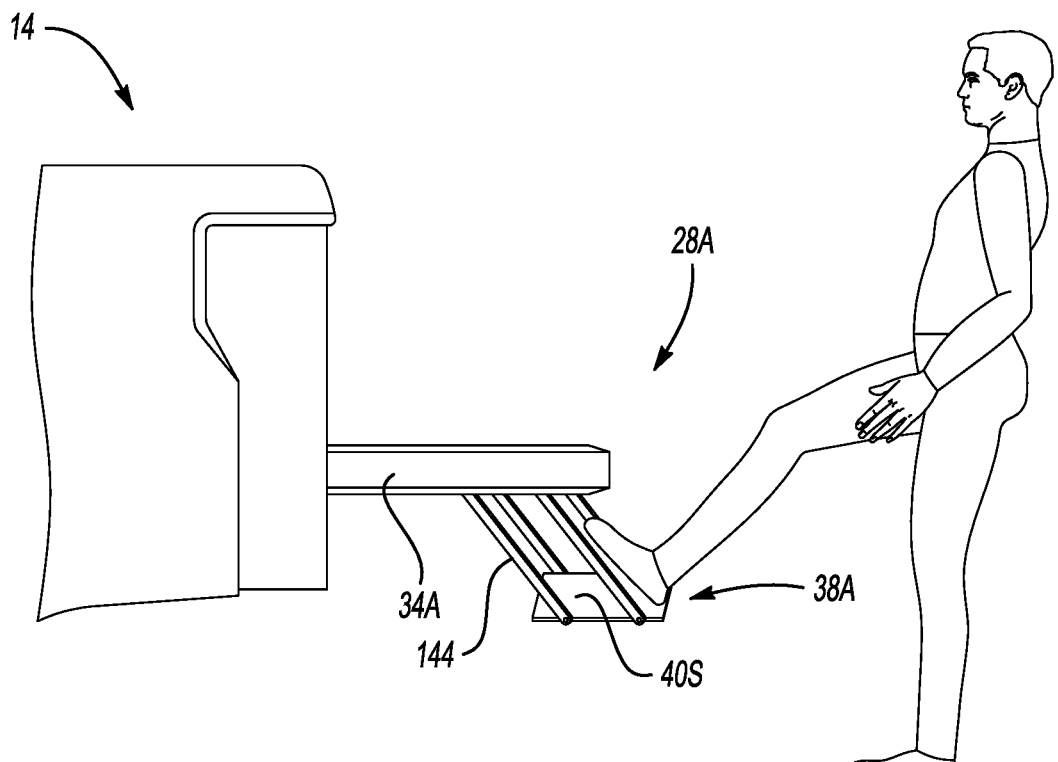
FIG. 14 illustrates a side view of the secondary tailgate in the extended position of FIG. 12 when the primary tailgate is in an open position.
Figure 15:
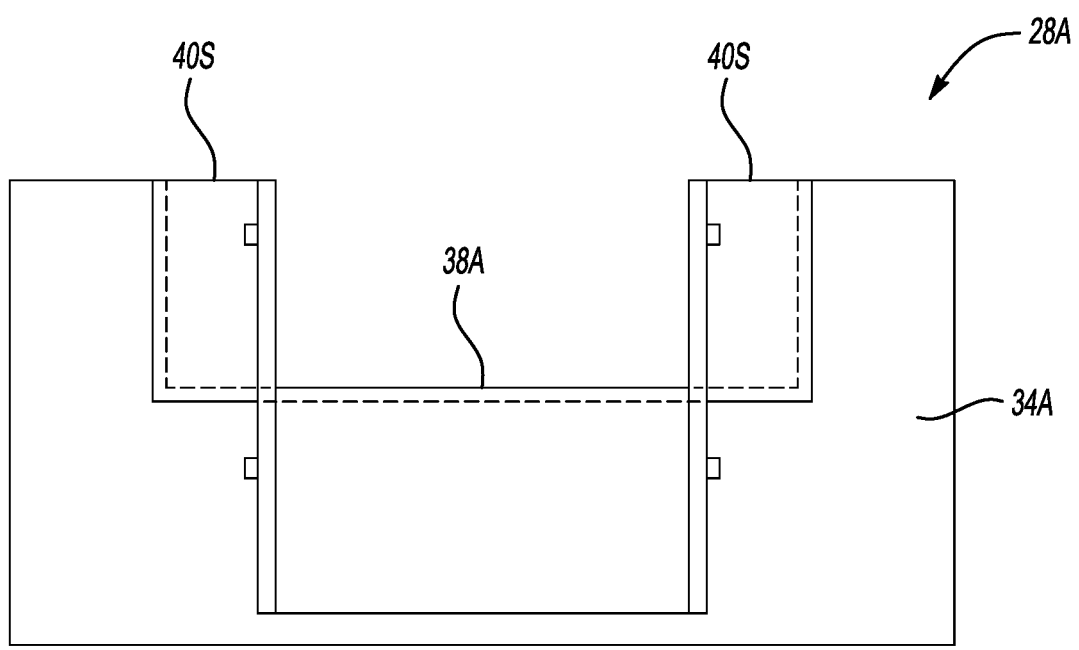
FIG. 15 illustrates a rear view of the primary tailgate and secondary tailgate of FIG. 12 when the secondary tailgate is in an accessing position.

When the primary tailgate 34A is in the fully open position and the secondary tailgate 38A is in the extended position as shown in FIG. 14, the secondary tailgate 38A is substantially horizontal and is vertically beneath the primary tailgate 34A. The secondary tailgate 38A can thus provide a step for a user to access the cargo bed area 14. The secondary tailgate 38 in this position could also provide a footrest for a user seated on the primary tailgate 34A and facing away from the cargo bed area 14.

Features of the disclosed examples include a tailgate assembly including a secondary tailgate that can retract within a primary tailgate of the tailgate assembly. Retracting the secondary tailgate within the primary tailgate can provide clearance for, among other things, a user to load and unload cargo from a cargo area of the vehicle. In some examples, the secondary tailgate can additionally move to an extended position to provide a step to the cargo area of the vehicle when the tailgate assembly is in a fully open position.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A tailgate assembly, comprising:
a primary tailgate having a cargo bed access opening, the primary tailgate moveable between a closed position and a fully open position relative to a cargo bed of a vehicle; and
a secondary tailgate that can move between a blocking position where the secondary tailgate extends into the cargo bed access opening and an accessing position where the secondary tailgate is retracted away from the cargo bed access opening, the secondary tailgate at least partially retracted into a portion of the primary tailgate that is vertically beneath the cargo bed access opening when the primary tailgate is in the closed position
wherein the primary tailgate is configured to be pivotably coupled to a cargo bed of a vehicle such that the primary tailgate can pivot relative to the cargo bed back and forth between the closed position and the fully open position, the primary tailgate substantially vertical when in the closed position, the primary tailgate substantially horizontal when in the fully open position,
wherein the primary tailgate includes a driver side portion, a passenger side portion, and an intermediate portion disposed between the driver side portion and the passenger side portion,
wherein, when the primary tailgate is in the closed position, a vertical height of the intermediate portion is less than a vertical height of both the driver side portion and the passenger side portion, the secondary tailgate at least partially retracted into the intermediate portion of the primary tailgate when the secondary tailgate is in the accessing position.

2. The tailgate assembly of claim 1, wherein the secondary tailgate is slidably coupled to the primary tailgate, wherein the secondary tailgate is slidable, relative to the primary tailgate, back and forth between the blocking position and the accessing position.

3. The tailgate assembly of claim 1, wherein the primary tailgate is configured to be pivotably coupled to a cargo bed of a vehicle such that the primary tailgate can pivot relative to the cargo bed back and forth between the closed position and the fully open position, the primary tailgate substantially vertical when in the closed position, the primary tailgate substantially horizontal when in the fully open position,
wherein, when the primary tailgate is in the fully open position, a user can move into the cargo bed access opening to be horizontally closer to the cargo bed of the vehicle when the secondary tailgate is in the accessing position.

4. The tailgate assembly of claim 1, wherein the secondary tailgate is at least partially retracted into an interior of the primary tailgate when in the accessing position.

5. The tailgate assembly of claim 4, further comprising an inner panel of the primary tailgate and an outer panel of the primary tailgate, wherein the interior of the primary tailgate is provided between the inner panel and the outer panel.

6. The tailgate assembly of claim 1, further comprising a driver side latch and a passenger side latch, the driver side latch disposed between a portion of the primary tailgate and a driver side of the secondary tailgate, the passenger side latch disposed between another portion of the primary tailgate and a passenger side of the secondary tailgate, the driver side latch and the passenger side latch transitionable between respective unlatched and latched positions, the driver side latch and the passenger side latch configured to hold the primary tailgate in the blocking position when the driver side latch and the passenger side latch are in latched positions.

7. The tailgate assembly of claim 6, wherein the driver side latch and the passenger side latch are each electronic latches.

8. The tailgate assembly of claim 1, further comprising at least one fixed rail member secured to the primary tailgate and at least one sliding rail member secured to the secondary tailgate, the at least one fixed rail member and the at least one sliding rail member slidably coupling together the primary tailgate and the secondary tailgate, the at least one fixed rail member and the at least one sliding rail member slidable relative to each other to permit sliding movement of the secondary tailgate between the retracted position and the blocking position.

9. The tailgate assembly of claim 8, wherein the at least one fixed rail member is bowed relative to a longitudinal axis of the at least one fixed rail member such that, as the secondary tailgate slides from the retracted position to the blocking position, the secondary tailgate is moved outwardly toward an outer surface of the primary tailgate or inwardly toward an inner surface of the primary tailgate.

10. The tailgate assembly of claim 1, wherein the primary tailgate includes a driver side portion, a passenger side portion, and an intermediate portion disposed between the driver side portion and the passenger side portion,
wherein, when the primary tailgate is in the closed position, the cargo access opening is vertically above the intermediate portion and horizontally between the driver side portion and the passenger side portion.

11. A tailgate assembly, comprising:
a primary tailgate having a cargo bed access opening, the primary tailgate moveable between a closed position and a fully open position relative to a cargo bed of a vehicle; and
a secondary tailgate that can move between a blocking position where the secondary tailgate extends into the cargo bed access opening and an accessing position where the secondary tailgate is retracted away from the cargo bed access opening, the secondary tailgate at least partially retracted into a portion of the primary tailgate that is vertically beneath the cargo bed access opening when the primary tailgate is in the closed position,
wherein the secondary tailgate can further move to an extended position where the secondary tailgate is extended away, and spaced a distance from, the primary tailgate.

12. The tailgate assembly of claim 11, wherein the primary tailgate is configured to be pivotably coupled to a cargo bed of a vehicle such that the primary tailgate can pivot relative to the cargo bed back and forth between the closed position and the fully open position, the primary tailgate substantially vertical when in the closed position, the primary tailgate substantially horizontal when in the fully open position, wherein, when the primary tailgate is in the fully open position and the secondary tailgate is in the extended position, the secondary tailgate is substantially horizontal and is vertically beneath the primary tailgate such that the secondary tailgate provides a step.

13. The tailgate assembly of claim 12, wherein, when the primary tailgate is in the closed position and the secondary tailgate is in the extended position, the secondary tailgate is substantially vertical and is horizontally aft the primary tailgate relative to an orientation of the vehicle.

14. The tailgate assembly of claim 11, further comprising a bar linkage mechanism that couples the secondary tailgate to the primary tailgate, the secondary tailgate moveable back and forth between the extended position and the closed position via the bar linkage mechanism.

15. The tailgate assembly of claim 14, further comprising at least one fixed rail member secured to the primary tailgate and at least one sliding rail member secured to the secondary tailgate, the at least one fixed rail member and the at least one sliding rail member slidably coupling together the primary tailgate and the secondary tailgate, the at least one fixed rail member and the at least one sliding rail member slidable relative to each other to permit sliding movement of the secondary tailgate between the retracted position and the blocking position.

16. A method of providing access to a cargo bed of a vehicle, the method comprising:

retracting a secondary tailgate within a primary tailgate to move the secondary tailgate from a blocking position where the secondary tailgate extends into a cargo bed access opening to an accessing position where the secondary tailgate is retracted away from the cargo bed access opening, the secondary tailgate retracted into a portion of the primary tailgate that is vertically beneath the cargo bed access opening when the primary tailgate is in a closed position, wherein the primary tailgate includes a driver side portion, a passenger side portion, and an intermediate portion disposed between the driver side portion and the passenger side portion, wherein, when the primary tailgate is in the closed position, a vertical height of the intermediate portion is less than a vertical height of both the driver side portion and the passenger side portion, the secondary tailgate at least partially retracted into the intermediate portion of the primary tailgate when the secondary tailgate is in the accessing position.

17. The method of claim 16, further comprising:

moving the secondary tailgate from the blocking position to an extended position where the secondary tailgate is extended away, and spaced a distance from, the primary tailgate; and providing a step to a cargo bed of the vehicle using the secondary tailgate in the extended position.

* * * * *